United States Patent
Feller et al.

(10) Patent No.: US 10,843,655 B2
(45) Date of Patent: Nov. 24, 2020

(54) AIR BAG ARRANGEMENT FOR A VEHICLE-OCCUPANT-RESTRAINING SYSTEM AND METHOD FOR PRODUCING AN AIRBAG ARRANGEMENT

(71) Applicant: Joyson Safety Systems Germany GmbH, Aschaffenburg (DE)

(72) Inventors: Jens Feller, Illerkirchberg (DE); Axel Gruner, Langenau (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 149 days.

(21) Appl. No.: 16/013,636

(22) Filed: Jun. 20, 2018

(65) Prior Publication Data

US 2018/0370478 A1 Dec. 27, 2018

(30) Foreign Application Priority Data

Jun. 23, 2017 (DE) .................. 10 2017 210 660

(51) Int. Cl.
| | |
|---|---|
| *B60R 21/232* | (2011.01) |
| *B60R 21/2338* | (2011.01) |
| *B60R 21/235* | (2006.01) |
| *B60R 21/237* | (2006.01) |
| *B60R 21/18* | (2006.01) |
| *B60R 21/262* | (2011.01) |
| *B60R 21/213* | (2011.01) |

(52) U.S. Cl.
CPC .......... *B60R 21/232* (2013.01); *B60R 21/235* (2013.01); *B60R 21/2338* (2013.01); *B60R 21/18* (2013.01); *B60R 21/213* (2013.01); *B60R 21/237* (2013.01); *B60R 21/262* (2013.01); *B60R 2021/23542* (2013.01)

(58) Field of Classification Search
CPC ..... B60R 21/18; B60R 21/213; B60R 21/232; B60R 21/235; B60R 21/237; B60R 21/2338; B60R 21/262; B60R 2021/23542; B60R 2021/23386
See application file for complete search history.

(56) References Cited

U.S. PATENT DOCUMENTS

| | | | |
|---|---|---|---|
| 6,805,374 B2 | 10/2004 | Saderholm et al. | |
| 7,303,206 B2 * | 12/2007 | Kippschull | ........... B60R 21/201 280/728.2 |
| 7,357,408 B2 | 4/2008 | Hall et al. | |
| 7,401,805 B2 * | 7/2008 | Coon | .................... B60R 21/201 280/730.2 |

(Continued)

FOREIGN PATENT DOCUMENTS

| | | |
|---|---|---|
| DE | 101 22 838 B4 | 8/2005 |
| DE | 10 2006 049 418 A1 | 4/2008 |

(Continued)

*Primary Examiner* — Laura Freedman
(74) *Attorney, Agent, or Firm* — Gordon Rees Scully Mansukhani, LLP

(57) ABSTRACT

It is provided an airbag arrangement for a vehicle-occupant-restraining system, comprising an airbag, wherein at least one airbag layer delimits an inflatable volume of the airbag; and at least one fastening tab, which is connected to the airbag layer and is intended for fastening the airbag on a vehicle component. The entire fastening tab is formed from a different material to that of the airbag layer.

15 Claims, 4 Drawing Sheets

(56) References Cited

U.S. PATENT DOCUMENTS

| | | | |
|---|---|---|---|
| 7,547,038 B2 | 6/2009 | Coleman | |
| 7,731,224 B2 | 6/2010 | Enriquez et al. | |
| 7,735,857 B2 * | 6/2010 | Hidaka | B60R 21/213 |
| | | | 280/728.2 |
| 7,766,369 B2 * | 8/2010 | Bradburn | B60R 21/235 |
| | | | 280/728.2 |
| 7,823,914 B2 * | 11/2010 | Cheal | B60R 21/201 |
| | | | 280/728.2 |
| 7,980,585 B2 * | 7/2011 | Cheal | B60R 21/201 |
| | | | 280/728.2 |
| 8,006,998 B2 * | 8/2011 | Hatfield | B60R 21/232 |
| | | | 280/730.2 |
| 8,091,918 B2 * | 1/2012 | Mitchell | B60R 21/201 |
| | | | 280/728.2 |
| 2002/0167153 A1 | 11/2002 | Kippschull | |
| 2010/0207367 A1 | 8/2010 | Weyrich et al. | |
| 2011/0042921 A1 | 2/2011 | Kjell et al. | |

FOREIGN PATENT DOCUMENTS

| | | |
|---|---|---|
| DE | 20 2007 015 431 U1 | 1/2009 |
| DE | 10 2009 033 375 A1 | 3/2011 |
| DE | 10 2010 002 821 A1 | 9/2011 |
| DE | 20 2011 108 508 U1 | 4/2012 |
| DE | 10 2013 217 064 A1 | 5/2015 |
| JP | 2014218117 A * | 11/2014 |
| WO | WO 2015/028518 A1 | 3/2015 |

* cited by examiner

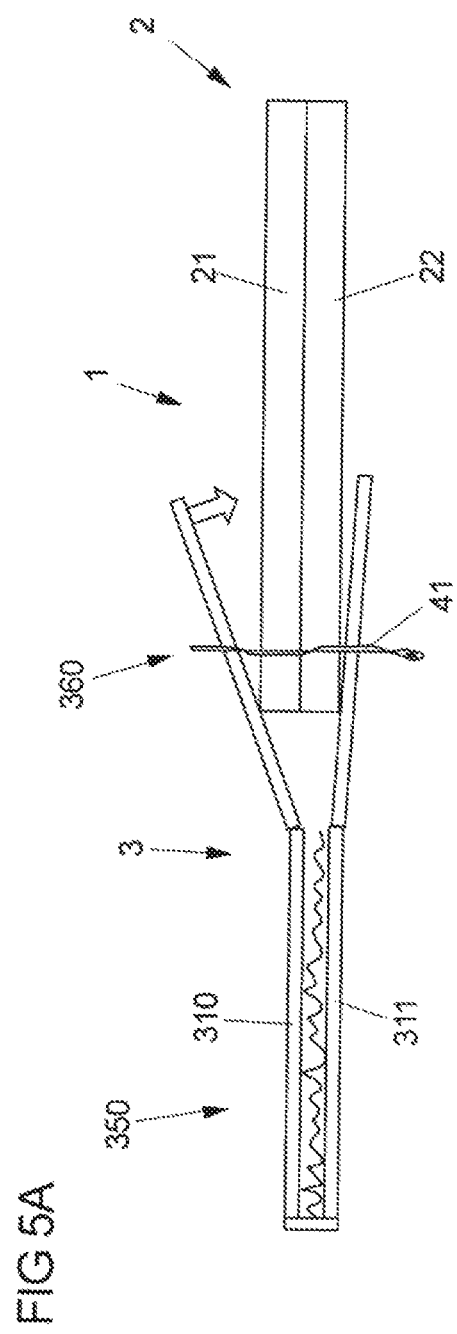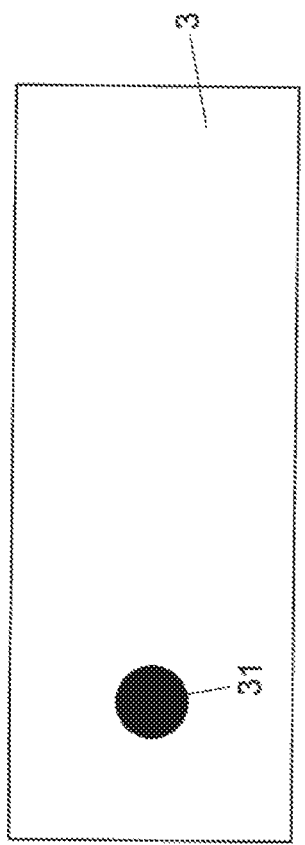

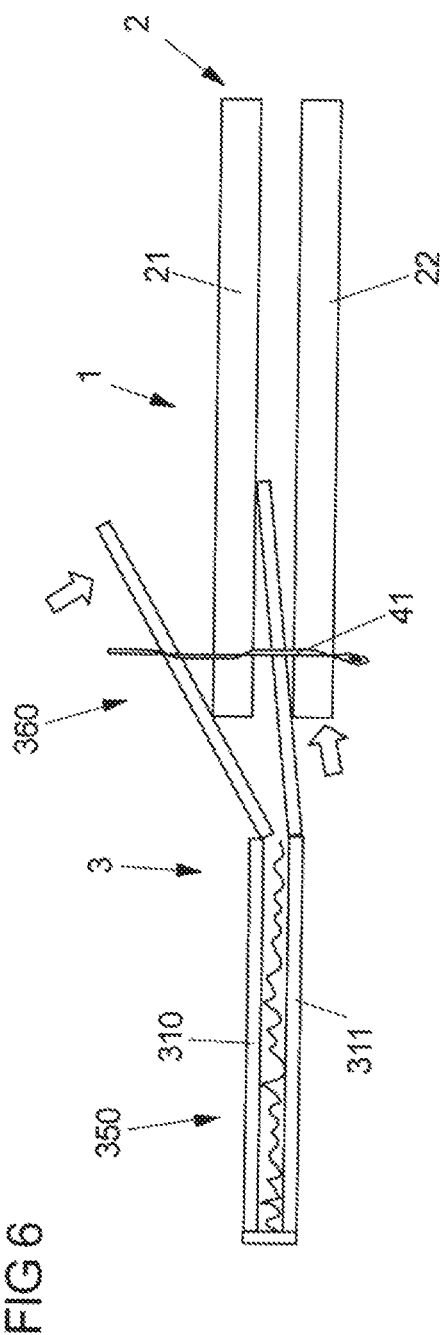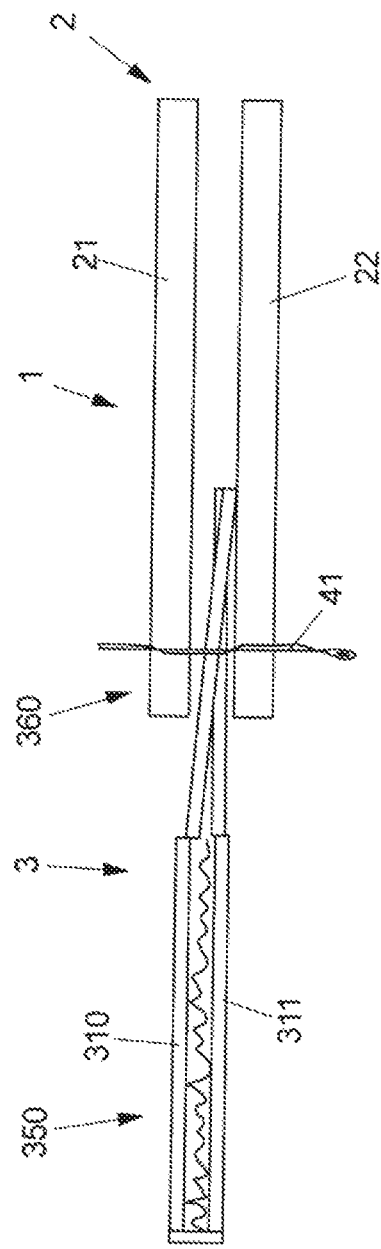

AIR BAG ARRANGEMENT FOR A VEHICLE-OCCUPANT-RESTRAINING SYSTEM AND METHOD FOR PRODUCING AN AIRBAG ARRANGEMENT

REFERENCE TO RELATED APPLICATION

This application claims priority to German Patent Application No. 10 2017 210 660.3 filed on Jun. 23, 2017, the entirety of which is incorporated by reference herein.

BACKGROUND

The invention relates to an airbag arrangement for a vehicle-occupant-restraining system and to a method for producing an airbag arrangement.

The prior art discloses the practice of connecting airbags, in particular curtain airbags (HSABs—head side airbags), to the vehicle with the aid of a plurality of fastening tabs. For example, the fastening tabs serve to fix the airbag, or the entire airbag module, to a roof frame and, once the airbag has been triggered, to stabilize the position of the inflated airbag. The airbag is fastened via the fastening tabs, in particular, using fastening elements (for example fastening clips), which are guided through an opening in the fastening tab and are connected to the vehicle.

For example, U.S. Pat. No. 7,547,038 B2 discloses such an airbag, the fastening tabs in this document being designed to accommodate a reinforcing element. However, the design of such fastening tabs is complex and also can be adapted to different fastening clips only with relatively high outlay.

SUMMARY

The problem on which the invention is based is that of providing for an airbag fastening which can be established, and adapted to different fastening clips, in as straightforward a manner as possible.

This problem is solved by the provision of the airbag arrangement having features as described herein and by the method for producing an airbag having features as described herein.

Accordingly, the invention provides an air bag arrangement for a vehicle-occupant-restraining system, having an airbag, wherein at least one airbag layer delimits an inflatable volume of the airbag; and at least one fastening tab, which is connected to the airbag layer and is intended for fastening the airbag on a vehicle component, wherein the entire fastening tab is formed from a different material to that of the airbag layer.

The fastening tab is therefore produced separately, as a result of which in particular adaptation of the fastening tab to the geometry of a fastening element (for example in the form of a fastening clip) which interacts with the tab is simplified. It is also conceivable for a plurality of differently configured fastening tabs to be fitted on the airbag (e.g. in order to obtain different degrees of loading of the fastening elements at different positions of the airbag). The fastening tab is formed for example at least partially in two layers. For example, the two layers of the fastening tab are connected to one another in one piece, i.e. they are formed by virtue of a single material layer being folded over.

It is also conceivable for one of the layers of the fastening tab to be connected to a first airbag layer and for the other layer of the fastening tab to be connected to a second layer of the airbag ("Y design"). For example, the layers of the fastening tab are each fitted on an outer side of the airbag layer. It is also possible, however, for at least one of the layers of the fastening tab to extend between the airbag layers and to be connected, for example, to an inner side of at least one of the airbag layers.

The fastening tab, however, can also be formed at least partially in a single layer. The "single-layered" configuration of the fastening tab means, in particular, that the fastening tab is made up predominantly (e.g. more than 50% of its surface area) or completely of just a single material layer (which is not folded over).

For example, the fastening tab is formed from a woven-fabric material. The woven-fabric material is, for example, a woven-fabric material which is designed for producing a belt strap of a vehicle seat-belt arrangement.

It is additionally conceivable for the material of the fastening tab to have a higher tear strength (tensile strength) than the material of the airbag layer.

The fastening tab is connected to the airbag layer, in particular, via a seam or integrally (in particular by adhesive bonding). The seam is, for example, a circumferential seam or a peripheral seam of the airbag, said seam delimiting the inflatable volume of the airbag at least partially and connecting the in particular two layers of the airbag to one another along a periphery of the airbag layers. It is also conceivable, however, for the seam to differ from a circumferential or peripheral seam of the airbag (i.e. the seam is present in addition to the circumferential or peripheral seam).

The fastening tab projects, in particular, from a periphery of the airbag or projects beyond the periphery of the airbag.

According to another configuration of the invention, the fastening tab has at least one fastening opening through which to guide a fastening element (e.g. in the form of a fastening clip). The periphery of the fastening opening is strengthened and/or reinforced, for example, at least partially. The periphery of the fastening opening is strengthened, that is to say in particular fabric threads in this region of the fastening tab are connected to one another, for example by the fastening tab material being subjected to the action of heat (e.g. by laser or ultrasound), by one or more seams (which run around, in particular, the fastening opening) being produced and/or by use being made of an adhesive. The fastening opening is produced, for example, mechanically (for instance by punching or cutting) or by laser cutting.

It is possible for the fastening opening to be rectangular or oval. This geometry of the fastening opening can help to counteract rotation of the fastening element in the fastening opening. It is also conceivable for the shape of the fastening opening to be selected in dependence on the outer geometry (e.g. round or polygonal) of the fastening element. It would thus also be possible for the fastening opening to form any desired polygon or to have a star-shaped geometry. The fastening element used may be, for example as already mentioned above, a fastening clip, a rivet or a screw. However, it is, of course, the case that the invention is not restricted to a certain fastening-opening geometry.

According to another development of the invention, the airbag arrangement comprises a rotation-prevention device (in particular in the form of an element which is present in addition to a fastening tab), which counteracts rotation of a fastening element guided through the fastening opening. The rotation-prevention device is formed for example from a material which is more rigid than the material of the fastening tabs (e.g. from a plastics material or a metal).

It is further conceivable for the fastening tab to have at least one strengthened and/or reinforced portion (e.g. in the form of a seam), at least part of which extends on a side of the fastening opening which is directed away from the airbag. This portion serves, in particular, to limit tearing of the fastening opening and to avoid the fastening tab being torn off.

The invention also relates to a method for producing an airbag arrangement for a vehicleoccupant-restraining system, in particular an airbag arrangement designed in the manner described above, having the following steps:

providing an airbag, wherein at least one airbag layer delimits an inflatable volume of the airbag;

connecting a fastening tab to the airbag layer in order for the airbag to be fastened on a vehicle component, wherein the entire fastening tab is formed from a different material to that of the airbag layer.

The fastening tab is connected to the airbag, for example, by welding and/or for example prior to the airbag being folded. It is also conceivable, however, for the fastening tab to be fitted following the folding operation.

Of course, the embodiments described above in relation to the airbag arrangement according to the invention can also be used analogously for the development of the method according to the invention.

BRIEF DESCRIPTION OF THE DRAWINGS

The invention will be explained in more detail herein below by way of exemplary embodiments and with reference to the figures, in which:

FIGS. 5A and 5B show a double-layered fastening tab according to another exemplary embodiment of the invention.

FIG. 6 shows a modification of FIGS. 5A and 5B.

FIG. 7 shows a further modification of FIGS. 5A and 5B.

DETAILED DESCRIPTION

Figure 1:
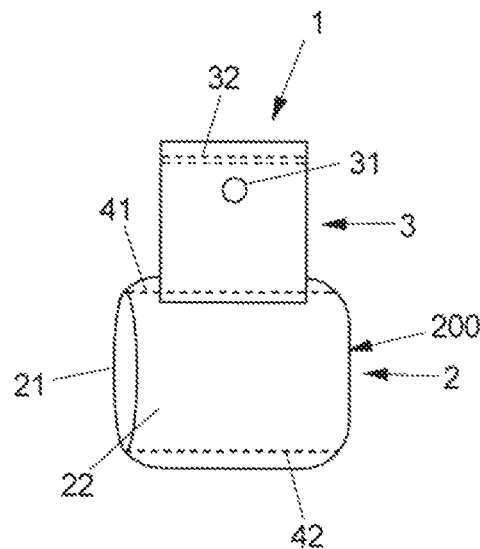
FIG. 1 shows, schematically, an airbag arrangement according to a first exemplary embodiment of the invention.

The airbag arrangement 1 according to the invention illustrated schematically in FIG. 1 comprises an airbag 2 and a fastening tab 3, which is fastened on the airbag 2. The airbag 2 has at least two airbag layers 21, 22, which define an inflatable volume 200 of the airbag 2. The inflatable volume 200 defined by the airbag layers 21, 22 is, for example, a protective portion or a gas-channelling portion of the airbag 2.

In the present case, the inflatable volume 200 of the airbag 2 is delimited by a peripheral seam or circumferential seam 41, which runs along an (upper) peripheral portion of the airbag layers 21, 22, and by a lower seam 42. It is conceivable for an inflatable protective volume of the airbag to extend beneath the lower seam 42 (in particular when the airbag 2 is a curtain airbag). According to the exemplary embodiment of FIG. 1, the fastening tab 3 is connected to the airbag 2 via the circumferential seam 41.

The fastening tab 3 is formed from a different material to that of the layers 21, 22 of the airbag 2, for example from a layer of a seat-belt material ("belt strap webbing"). In particular, the material of the fastening tab 3 has a higher tensile strength (in particular along the main-extent direction of the fastening tab 3) than the material of the airbag layers 21, 22. The fastening tab 3 is thus produced separately from the airbag 2, which makes it easier for the fastening tab 3 to be adapted to, for example, the geometry of a fastening element (see below) interacting therewith.

The fastening tab 3 also has a fastening opening 31 through which to guide a fastening element (not illustrated), wherein the fastening element can be connected to a vehicle component in order for the airbag 2 to be attached to a vehicle.

The fastening tab 3 also has a reinforcing seam 32, which extends above the fastening opening 31, i.e. on a side of the fastening opening 31 which is directed away from the airbag 2. The seam 32 serves to secure the connection of the fastening tab 3 to the vehicle via the fastening element when the fastening opening 31 is torn, i.e. to counteract, or to prevent, the situation where the fastening tab 3 is torn off from the fastening element.

Figure 2:
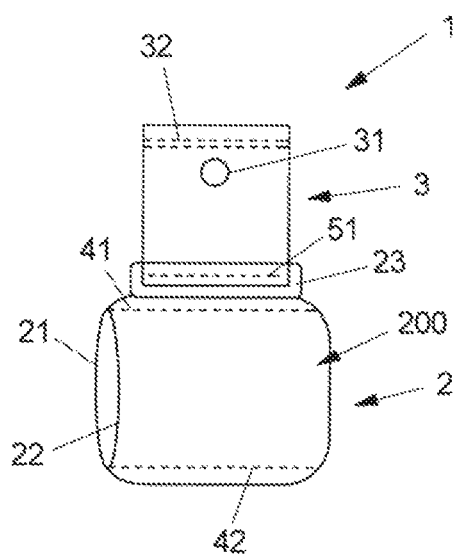
FIG. 2 shows, schematically, an airbag arrangement according to a second exemplary embodiment of the invention.

It is not imperative for the fastening tab 3 to be connected to the airbag via a peripheral or circumferential seam. Rather, it is also conceivable for the fastening tab 3 to be connected to the airbag 2 via a fastening seam 51, which is provided in addition to the peripheral seam 41, as is illustrated in FIG. 2. The fastening seam 51 connects the fastening tab 3 to a portion 23 of at least one of the airbag layers 21, 22.

Figure 3:
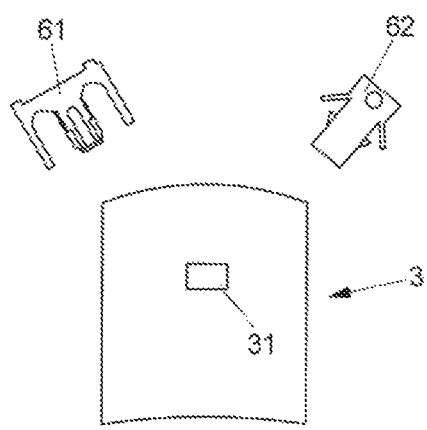
FIG. 3 shows a modification of the fastening tab from FIGS. 1 and 2.

In addition, it is not imperative for the geometry of the fastening opening 31 to be circular. Therefore, for example an oval or rectangular configuration is also possible, as is shown for instance in FIG. 3. In particular, the geometry of the fastening opening 31 is adapted to the shape of the fastening element (cf. the fastening elements in the form of the fastening clips 61, 62, which are likewise shown in FIG. 3). A rectangular or oval configuration of the fastening opening 31 can counteract undesirable rotation of the fastening element in the fastening opening.

Figure 4:
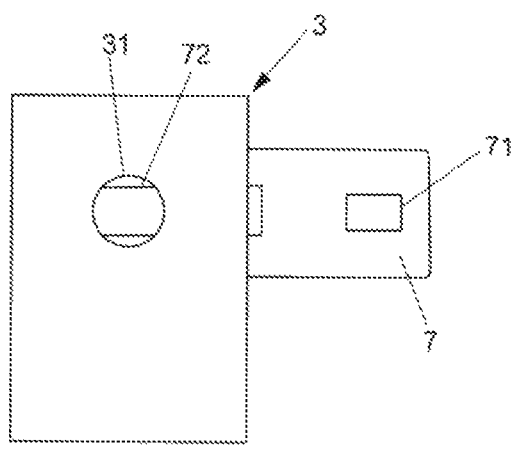
FIG. 4 shows a fastening tab and a rotation-prevention device of an airbag arrangement according to a further exemplary embodiment of the invention.

It is also possible to realize rotation of the fastening element in the fastening opening 31 by an additional rotation-prevention device. Such a rotation-prevention device 7 is shown in FIG. 4, wherein the rotation-prevention device 7 is of swing-action design. In the installed state, the rotation-prevention device 7 will extend on either side of the fastening tab 3 (i.e. both on a side which is directed away from the observer and on a side which is directed toward the observer). FIG. 4 shows the swung-open state of the rotation-prevention device 7.

The rotation-prevention device 7 has two rectangular openings 71, 72, which, once the rotation-prevention device 7 has been installed on the fastening tab 3, are in alignment with one another. The fastening element (the fastening clip) will extend through the two openings 71, 72 of the rotation-prevention device 7 and the fastening opening 31 of the fastening tab 3. The geometry of the fastening opening 31 can differ from the geometry of the shape of the openings 71, 72 of the rotation-prevention device 7 (the shape of the openings being adapted to the shape of the fastening element).

It is, of course, conceivable for the fastening tab 3 shown in FIGS. 1 and 2 also to be provided with a rotation-prevention device, in particular in the manner of the rotation-prevention device from FIG. 4.

FIGS. 5A and 5B relate to a further exemplary embodiment of the invention, FIG. 5A illustrating a sectional view, and FIG. 5B illustrating a plan view, of the fastening tab 3. According to these figures, the fastening tab 3 is formed in two layers (layers 310, 311). The layers 310, 311 are connected to one another, for example, in one piece, i.e. they are produced by virtue of a single piece of material being folded over. It is also the case that the layers 310, 311 are connected to one another, e.g. integrally or by being fused, in a first portion 350 of the fastening tab 3, said portion being remote from the airbag 2. In a second portion 360 of the fastening tab 3, the layers 310, 311 are not connected to one another, in particular are not fused to one another.

Rather, the layers 310, 311 form an opening, into which a portion of the airbag 2 extends, and therefore, in the region 360, the fastening tab 3 covers over the portion of the airbag 2. Accordingly, the first layer 310 of the fastening tab 3 extends on an outer side of a first airbag layer 21 and the second layer 311 of the fastening tab 3 extends on an outer side of a second layer 22 ("Y design") of the airbag 2. The layers 310, 311 of the fastening tab 3 are connected to one another, and to the airbag 2, by a single seam 41, which is, for example, a peripheral seam of the airbag 2.

FIG. 6 shows a modification of FIGS. 5A and 5B. Accordingly, part of the layer 311 of the fastening tab 3 extends between the airbag layers 21, 22. Of course, it is also conceivable for the other layer 310 of the fastening tab 3 to be located between the airbag layers 21, 22 or for both layers 310, 311 of the fastening tab 3 to extend between the airbag layers 21, 22 (FIG. 7).

The invention claimed is:

1. An airbag arrangement for a vehicle-occupant-restraining system, comprising
    an airbag, wherein at least one airbag layer delimits an inflatable volume of the airbag; and
    at least one fastening tab, which is connected to the airbag layer and is intended for fastening the airbag on a vehicle component, wherein the fastening tab is formed at least partially in two layers,
    wherein the entire fastening tab is formed from a different material to that of the airbag layer,
    wherein the fastening tab has at least one fastening opening through which to guide a fastening element,
    and wherein the layers of the fastening tab are connected to one another in a region of the fastening tab which is remote from the airbag and which comprises the fastening opening, and
    wherein one of the layers of the fastening tab is connected to a first airbag layer and the other layer of the fastening tab is connected to a second airbag layer.

2. The airbag arrangement according to claim 1, wherein the fastening tab has two layers connected to one another in one piece.

3. The airbag arrangement according to claim 1, wherein the fastening tab is formed at least partially as a single layer.

4. The airbag arrangement according to claim 1, wherein the fastening tab is formed from a woven-fabric material.

5. The airbag arrangement according to claim 4, wherein the fastening tab is formed from a woven-fabric material for producing a belt strap of a vehicle seat-belt arrangement.

6. The airbag arrangement according to claim 1, wherein the material of the fastening tab has a higher tear strength than the material of the airbag layer.

7. The airbag arrangement according to claim 1, wherein the fastening tab is connected to the airbag layer via a seam or by bonding.

8. The airbag arrangement according to claim 7, wherein the seam is a circumferential seam or a peripheral seam which delimits the inflatable volume of the airbag at least partially.

9. The airbag arrangement according to claim 8, further comprising a rotation-prevention device, which counteracts rotation of a fastening element guided through the fastening opening.

10. The airbag arrangement according to claim 7, wherein the seam differs from a circumferential seam or peripheral seam which delimits the inflatable volume of the airbag at least partially.

11. The airbag arrangement according to claim 1, wherein the fastening tab projects from a periphery of the airbag or projects beyond the periphery of the airbag.

12. The airbag arrangement according to claim 1, wherein a periphery of the fastening opening is strengthened and/or reinforced at least partially.

13. The airbag arrangement according to claim 1, wherein the fastening opening is rectangular or oval.

14. The airbag arrangement according to claim 1, wherein the fastening tab has at least one strengthened and/or reinforced portion, at least part of which extends on a side of the fastening opening which is directed away from the airbag.

15. A method for producing an airbag arrangement for a vehicle-occupant-restraining system, having the following steps:
    providing an airbag, which has at least one airbag layer delimiting an inflatable volume of the airbag;
    connecting a fastening tab to the airbag layer in order for the airbag to be fastened on a vehicle component, wherein the entire fastening tab is formed from a different material to that of the airbag layer;
    wherein the fastening tab is formed at least partially in two layers and includes at least one fastening opening through which to guide a fastening element; and
    connecting the layers of the fastening tab together in a region of the fastening tab which is remote from the airbag and which includes the fastening opening, and
    wherein one of the layers of the fastening tab is connected to a first airbag layer and the other layer of the fastening tab is connected to a second airbag layer.

* * * * *